Sept. 14, 1926.

E. E. MARX 1,600,120

CHAIN FASTENER

Filed Sept. 22, 1925

Inventor
Edward E. Marx.

By Clarence A. O'Brien
Attorney

Patented Sept. 14, 1926.

1,600,120

UNITED STATES PATENT OFFICE.

EDWARD E. MARX, OF BEAVER FALLS, PENNSYLVANIA.

CHAIN FASTENER.

Application filed September 22, 1925. Serial No. 57,885.

This invention relates to improvements in chain fasteners and particularly to a fastening device for use in connection with automobile tire chains to secure the ends or sections thereof in assembled relation on a wheel.

An object of the invention resides in providing a chain fastener forming an independent unit separate from the chain and adapted to secure the same in assembled relation on an automobile wheel and so constructed that the engagement of the links of the chain in the fastening device will normally lock the same in assembled relation therewith and prevent the accidental disengagement of the fastening device from the chain and the consequent loss thereof.

A further object of the invention resides in providing a fastening unit for chains particularly non-skid chains used on motor vehicles comprising a pair of interconnected independently operated fastening devices constructed so that the stresses applied to the fastening device due to the pull exerted on the chain will exert a stress thereon adapted to produce such an operation of the fastening device for opposing lateral stresses applied by the engagement of the fastener in mud over the surface of the roadway or other obstructions which normally have the tendency to open fastening devices of this character, and cause the loss of the chains from the wheel.

The invention further comprehends improvements in the construction of the unit fastening devices so that the stresses applied thereto in different directions will tend to hold the same in interlocked connection with the links and prevent the loss of chains through accidental disengagement, which features are pointed out in the following detailed description, and in the claims directed to a preferred form of the invention, it being understood, however, that various changes in the size, shape and arrangement of the parts may be made without departing from the spirit or scope of the invention as herein set forth.

In the drawing forming part of this application:

A pair of link members are indicated at 1, which are secured together in spaced parallel relation by tubular rivets 2 at the opposite ends thereof. The tubular rivets each support a pair of cooperating fastener elements 3 and 4 respectively, which comprise duplicate hook members 6 pivotally mounted on the rivets 2 in opposite and cooperating relation.

Figure 1:
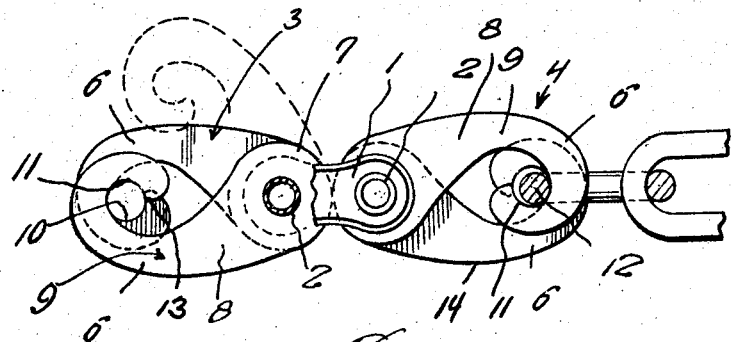
Figure 1 illustrates a plan view of the improved fastener forming the subject matter of this invention, portions of which are shown in assembled relation of a chain, and portions being shown in open position in dotted lines.
Figure 2:
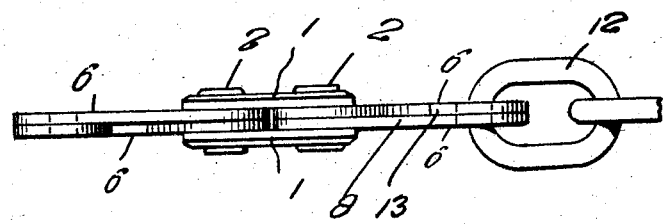
Fig. 2 is a side elevation of the fastening device illustrated in Fig. 1.

Each hook member is formed with a base portion 7 of substantial width as shown in Fig. 1, and having the major portion thereof rounded in circumferential relation with the opening receiving the rivet 2, and from which extends the hook portion in tapering relation as at 8 to a portion of narrow width as at 9 from which the hook member is curved on a substantially large arc as indicated by the numeral 10 and is of substantially uniform width, while the end portion terminates in a substantially small curved portion 11 of a size slightly larger than the diameter of the cross section of the link 12.

The extreme end portion of the hook is curved so that it extends across the center line drawn between the center of the opening receiving the rivet 2 and the center of the arc forming the small curved portion of the hook as at 11, which end portion of the hook is indicated by the numeral 13. By this construction the ends 13 of each pair of hook members which cooperate to receive the link 12, overlap as illustrated in Fig. 1 for the purpose of effectively locking the link between the hook members and to prevent the accidental disengagement of said link from said hook members. In this way the pair of hook members cooperate with the link providing a self lock for the link in the position shown in Fig. 1.

In the construction as above described, it is to be understood that each pair of hook members 3 and 4 are operable independently of the other and that the hook face 6 of each pair of hook members cooperate with one another in the retaining of the link in engagement therewith as shown in Fig. 1. The links are inserted into the position shown in Fig. 1 by separating the pair of hook members through the moving of one of the members about the rivet 2 as the pivot so that the position assumed in dotted lines in Fig. 1, will permit the insertion of said link between said hooks which are afterwards moved toward each other into an overlapping position to permit the movement of the link from a position between the hooks adjacent to the rivet 2 between the ends 13 and into the portion of small diameter 11 as shown in Fig. 1.

In moving the link into the position shown in Fig. 1, the same will engage the portion of substantially large radius indicated by the numeral 10 and cause a separating movement of the hooks away from each other, which will bring the ends 13 into overlapping relation as shown while the links will be seated in the portion formed by the juncture of the large arcuate portion 10 and the small arcuate portion 11.

A pull on tire chains or other chains connected by this fastening device will operate to maintain the hook members 6 in the position shown in Fig. 1. When applied to a motor vehicle wheel for holding and fastening the tire chains on said wheel, it should be readily appreciated that the portion of the chain connected by the fastening device engages the ground, a pull will be exerted on the fastener while at the same time, if the wheel passes through a considerable amount of mud or the like, lateral stresses will be applied to the general direction of pull to the portion of the hook as indicated at 14 which will tend to move the ends 13 out of overlapping relation so that the pull exerted on the fastener in a longitudinal direction through the same and with the chain will neutralize this transverse stress which would otherwise have a tendency to move the hooks in greater overlapping relation and move the ends 13 out of their overlapping relation as shown in Fig. 1.

It will thus be seen that pulls exerted longtudinally of the fastening device will always operate to overcome and neutralize transverse stresses applied to the hook members which might tend to cause a disengagement of the links from said hook members. In this way the fastening device is self locking and when the parts are in the position shown in Fig. 1, any slacking of the chain causing a backing of the link 12 connected with the fastening device will not cause the link to become disengaged from the hook members in view of the overlapping end 13 preventing backing of the links.

Figure 3:
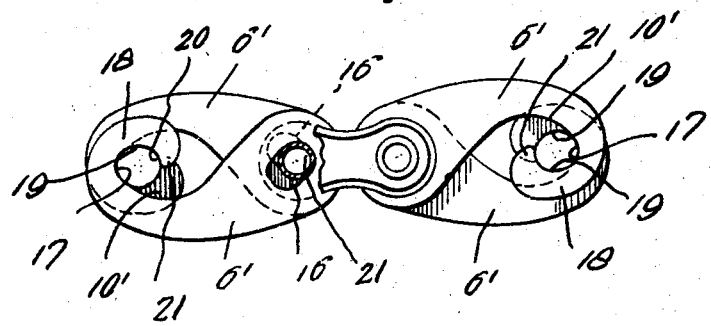
Fig. 3 is a view similar to Fig. 1, showing portions broken away and in section and illustrating a slightly modified construction to produce a greater opposing action between longitudinal and lateral stresses for equalizing the same and maintaining the fastener in self-locked relation with the links to which it is secured.

In Fig. 3, this neutralization of transverse stresses by longitudinal pulls is accentuated by providing the hook members 6' with diagonal slots 16 receiving the rivet 2' arranged so that they will lie in angular relation as shown in Fig. 3, in order that a pull on the hook members will cause the same to take the position shown in Fig. 3, while lateral stresses will operate to move the hook at the tubular rivets so they will lie in the opposite ends of the slots from that shown in Fig. 3. In this way, the stresses are absorbed through the relative movement of the butt ends of the hook members by the provision of the slots 16. This tendency of lateral stress to overcome longitudinal pull is also additionally guarded against by the provision of a greater arcuate portion portion as 10' than in the hook shown in Fig. 1, which is made on a substantially longer radius than the portion 10 of Fig 1.

At 17, this arc 10' merges into a substantially small arcuate portion in the end portion of the hook which is curved at 18, to provide a portion of larger arc at 19 and another portion of small arc at 20, while the ends of each of the hook members indicated at 21 extend normally in overlapping relation. These long arcuate portions 10' and 19 being arranged in angular relation, cooperate in the opposed relation of each pair of hook members to maintain the same in the position shown in Fig. 3, when a link is engaged between said members so that the end of the link will be seated in the portion of small curvature 17 through the cooperation of these curved surfaces with the link. This cooperation will take place without regard to the direction of the transverse stress applied which will be partially absorbed at the pivot of the link of the hook members on the tubular rivets 2'.

It should thus be understood from the above description, that a fastening device has been provided for tire chains adapted for use on automobiles which will effectively prevent the loss of the chains from the wheels through the accidental disengagement of the links therefrom by reason of the stress distribution and equalization of the same as above explained resulting in the self-locking of a link in each pair of hook members.

Having thus described my invention, what I claim as new is:—

1. A fastening device of the class described, comprising a pair of link members, pivot pins connecting said link members at the ends thereof, a pair of hook members pivotally mounted on each of said pivot pins, independently of one another, said hook members being of identical formation, and the hook members of each pair being mounted in opposed relation, each of said hook members being formed in a predetermined manner, for providing a cooperation between the free end portions of each pair of hook members for retaining a link therein in self-locked relation, one pair of hook members providing a lock in open position for the other pair of hook members to prevent opening of said last mentioned pair of hook members.

2. An article of manufacture providing a chain fastener, comprising a pair of duplicate link members, pivot pins mounted in opposite ends of said link members, and pairs of hook members pivotally mounted on said pivot pins, all of said hook members being duplicates and having the base portions of each pair mounted in superposed substantially coincident relation, and hook portions positioned in opposed relation in each pair and formed for self locking cooperation with the link of a chain.

3. A hook member for chain fasteners; wherein the chain fastener includes a pair of link members, pivot pins connecting said link members, and pairs of duplicate hook members pivotally mounted in opposed relation on said pivot pin for self locking cooperation with a chain link; comprising a flat body of sheet material having a large substantially circular base portion formed with a central opening, said body extending in tapered relation from said base portion and merging into a hook portion of substantially uniform width and having a rounded end, the end of said hooked portion being rearwardly extended toward the base portion and terminating substantially at the center of curvature of the part of the hook portion at the point of merger with the tapered extension from the base portion.

In testimony whereof I affix my signature.

EDWARD E. MARX.